US007990252B2

(12) United States Patent
Barton (10) Patent No.: US 7,990,252 B2
(45) Date of Patent: Aug. 2, 2011

(54) SAFETY SYSTEM AND METHOD FOR CONVENTIONAL LIGHTING FIXTURES

(76) Inventor: Robert A. Barton, Grafton, MA (US)

(*) Notice: Subject to any disclaimer, the term of this patent is extended or adjusted under 35 U.S.C. 154(b) by 393 days.

(21) Appl. No.: 12/233,567

(22) Filed: Sep. 18, 2008

(65) Prior Publication Data

US 2009/0072970 A1    Mar. 19, 2009

Related U.S. Application Data

(60) Provisional application No. 60/973,496, filed on Sep. 19, 2007.

(51) Int. Cl.
*G08B 1/00* (2006.01)
(52) U.S. Cl. ............... 340/333; 340/693.1; 340/815.45
(58) Field of Classification Search .............. 340/333, 340/693, 584, 628–630, 330–332, 815.45, 340/815.66, 815.661
See application file for complete search history.

(56) References Cited

U.S. PATENT DOCUMENTS

| 4,090,178 A | 5/1978 | Norris |
| 4,255,746 A | 3/1981 | Johnson et al. |
| 4,323,820 A | 4/1982 | Teich |
| 4,694,285 A | 9/1987 | Scripps |
| 4,893,224 A * | 1/1990 | Tinley ........................... 362/287 |
| 4,896,145 A * | 1/1990 | Lewkowicz ................ 340/693.1 |
| 4,985,661 A | 1/1991 | Lin |
| 5,379,195 A * | 1/1995 | Epstein ........................... 362/20 |
| 5,426,347 A | 6/1995 | Nilssen |
| 5,548,494 A | 8/1996 | Blackman |
| 5,733,037 A * | 3/1998 | Tennis et al. .............. 362/249.08 |
| 5,851,061 A | 12/1998 | Hegarty |
| 6,010,228 A * | 1/2000 | Blackman et al. ............... 362/95 |
| 6,505,950 B1 | 1/2003 | Natoli et al. |
| 6,805,469 B1 | 10/2004 | Barton |
| 7,118,235 B2 | 10/2006 | Barton |
| 2004/0218379 A1* | 11/2004 | Barton ........................... 362/95 |

* cited by examiner

*Primary Examiner* — Daniel Previl (57) ABSTRACT

A safety device is incorporated within conventional lighting fixtures, such as table lamps, floor lamps, wall lighting fixtures, ceiling lighting fixtures, chandeliers, recessed lighting fixtures, and decorative lighting fixture structural members such as ceiling medallions. The safety device incorporates several safety function response mechanisms within conventional lighting fixtures to conceal or obfuscate their presence. The safety device provides power failure lighting, alert signals in response to gas, smoke, fire, intrusion, and any other externally generated alarm signal. It may also provide night lighting. The safety device may include a safety module having a light and/or audio source, a power sensing circuit, a control circuit, and a light sensing circuit.

20 Claims, 8 Drawing Sheets

SAFETY SYSTEM AND METHOD FOR CONVENTIONAL LIGHTING FIXTURES

CROSS REFERENCES TO RELATED APPLICATION

The present application is a continuation-in-part of U.S. Provisional Patent Application No. 60/973,496, filed Sep. 19, 2007, currently pending.

BACKGROUND OF INVENTION

1. Field of Invention

The present invention relates generally to the combination of a safety and alerting system and conventional lighting fixtures, and more specifically, the combining of conventional lighting fixtures with a safety alerting system that responds to predetermined safety conditions by providing audio alerting, energy efficient night lighting and power failure lighting. The method of combining the ubiquitous conventional lighting fixture with a safety system renders the safety system itself obfuscated and concealed in plain view where its unobtrusive appearance may improve the likelihood that safety alerting, energy efficient night time safety lighting and power failure safety lighting will be more widely accepted and installed, resulting in safer inhabited spaces and lower electrical energy costs.

2. Discussion of Related Art

Power failure lighting devices which light up when a power failure occurs are described in many different embodiments and predominately teach how to provide power failure lighting using a specific apparatus for that purpose. Such devices are not designed to improve the aesthetic appearance of power failure safety lighting. They are not integrated with conventional light fixture or table/floor lamps as a means increase their acceptance as a standard safety item for inhabited spaces.

The prior art does not perceive or address the problem of safety or alerting lighting being conspicuous, thus limiting the locations where one would install such systems. The prior art does not describe or teach the a system or method for discreetly enabling lighting fixtures to gain the ability to provide safety alerting or to illuminate an area for extended periods of time during a power failure and to provide night light function when power is available. Additionally, no prior art addresses the availability and long term readiness of the alternate power source with a design that includes easily replaceable long shelf life batteries and/or as rechargeable power sources.

Prior art power failure lighting solutions are often comprised of similar elements including a case or housing, a lighting source, an alternate power source and sensing and control circuitry designed to activate the safety light source when power fails by using the alternate power source. Most prior art calls attention to the power failure lighting solutions. Prior art does not disclose a method or system to enable the many and varied styles of conventional lighting fixtures to provide illumination after primary power is no longer available.

In U.S. Pat. No. 4,985,661, Lin describes a specific desk lamp having a removable power failure light. Lin's emergency light solution has a main desk lamp fixture. It has an auxiliary battery powered lamp similar in look to the main desk lamp. The auxiliary lamp is removable from a notch, much like a plug-in emergency power failure flashlight. Lin's invention is two separate light fixtures and is limited to a desk lamp design. The auxiliary lamp design cannot be applied to other types of conventional lighting fixtures. The auxiliary lamp is conspicuous and remains unused when power is available.

In U.S. Pat. No. 5,426,347, Nilssen describes a lighting system with an emergency standby feature that relies on specific high frequency primary light source for the lighting fixture. The lighting system is not suitable for multiple varied styles of conventional lighting fixtures. It does not provide inconspicuous emergency lighting in a lighting fixture.

In U.S. Pat. No. 6,505,950, Natoli, et. al, describes a Lighted Newel Post where a light is concealed within a newel post for a stairway banister. The light may also be an emergency power failure light. Natoli suggests concealing a light, both standard and emergency lighting within another structure. It does not teach using emergency lighting with conventional lighting fixtures.

In U.S. Pat. No. 4,323,820, Teich discloses an emergency lighting system that teaches how to determine when primary power is lost due to power failure or due to opening of a line switch relying on a high frequency signal. It includes a conspicuous power failure lighting system.

In U.S. Pat. No. 5,851,061, Hegarty discloses a concealed emergency lighting invention that is a self contained emergency light fixture that is installed in a wall cavity, concealed by a movable cover and mirror. As with Natoli, Hegarty suggests concealing emergency lighting in other structures, such as a wall.

In U.S. Pat. No. 5,548,494, Blackman teaches an under-cabinet fluorescent light having a removable flashlight. The standard fluorescent light includes an alternate power source to function as the flashlight when removed from its under-cabinet position. The flashlight disclosed in Blackman is a specific lighting fixture design and the power failure solution cannot be utilized in other types of conventional lighting fixtures.

U.S. Pat. No. 4,694,285, Scripps teaches a combination electrical light and smoke/heat detector. The battery power source operates the heat sensor function. There is no power failure safety lighting in the combination fixture. It does not teach a purpose to integrate the combination with other fixtures than the specific housing described, nor increase the use of smoke detectors.

In U.S. Pat. No. 4,255,746, Johnson et al., describe a safety unit combined with a conventional lighting fixture that includes a fire detector and emergency light system. It does not teach a modular system having a power failure light that can be controlled with local or remote control signal communications to provide safety functions to multiple devices in multiple areas. It does not result in increased use of fire detectors since many homes have specific requirements as to the placement of fire detectors.

In U.S. Pat. No. 4,090,178, Norris discloses a combination smoke detector and lamp structure to reduce cost and to give the smoke detector the appearance of a lamp. It is a specific design, not modular, or remote controllable nor does it offer power failure lighting.

U.S. Pat. Nos. 6,805,469 and 7,118,235, by the current inventor, disclose a safety light concealed or obfuscated by integration with wiring devices such as switches, dimmers and receptacles covered by standard wall plates. Certain electrical work boxes containing light switches do not contain a neutral wire, but instead have the neutral wire in the electrical work box that directly feeds the lighting fixture, limiting where the safety light switch can be installed.

Another example of integrated emergency lights that exist as prior art include commercial ballast-driven fluorescent lighting fixtures that supply battery power to the ballast which in-turn lights the fluorescent lamps providing approximately 90 minutes of emergency lighting required to meet commercial life safety regulations. Using a battery backup system to supply power to the primary light source in a fixture is well known and represents cost savings and aesthetic appeal over having separately wired emergency safety light fixtures in addition to general illumination fixtures. Using the primary light source for emergency power is not amenable to conventional lighting fixtures such as residential style lighting fixtures and table or floor lamps due to size and cost constraints. Furthermore, the power necessary to illuminate the primary light source limits the illumination time of the emergency lighting.

Emergency exit signs are also available with battery backup in order to meet safety requirements. Depending on the light source power requirements, the safety light source may be the same as the primary light source, or the safety light can be provided by a separate, low power, safety light source. Exit signs provide a specific function showing where exit paths are and are not conventional lighting fixtures as described in the context of the present invention.

Fire, gas, water and intrusion alarms are well known in the prior art. None of the signaling methods have been integrated with a conventional lighting fixture to provide obscurity to the presence of an alerting system that can deliver alerts throughout an entire building if necessary.

Prior art generally discloses power failure lighting devices that either plug into a power outlet or replace the cover plate that surrounds switches and power outlets.

SUMMARY OF THE INVENTION

The present invention provides a method to universally integrate a safety light with table lamps, floor lamps, wall lighting fixtures, ceiling lighting fixtures, chandeliers, recessed lighting fixtures, and other conventional lighting fixtures and decorative lighting fixture structural members such as ceiling medallions, independent of the type or style of lighting fixture without substantially altering their conventional appearance, essentially concealing or obfuscating its presence. The present invention incorporates several safety function response mechanisms within conventional lighting fixtures to conceal or obfuscate their presence. Such safety function response mechanisms may include night lighting, power failure lighting, and audio alerting for life safety detectors such as gas, smoke, fire and intrusion. Concealing or obfuscating the safety system's presence in or with conventional lighting fixtures may increase the likelihood of more widespread adoption resulting in safer homes and buildings. Safety alerting response is provided for one or more of the following safety conditions: power failure lighting, alert signals for gas, smoke, fire, intrusion, and any other externally generated alarm signal.

According to one aspect of the invention, a safety system is combined with conventional lighting fixtures to provide energy efficient night lighting, power failure lighting and/or optional audible safety alerting. It provides energy saving night lighting when power is available, and when equipped with an alternate power source, it provides power failure lighting when power is not available. It also may be signaled to emit continuous or varying intensity light and/or sound when an alarm or other safety condition is present.

According to another aspect of the invention, concealment of the safety system is accomplished by adapting a safety alerting source to radiate light, sound, or both, from a structural element of a conventional lighting fixture. The safety alerting source itself is small and concealment becomes possible by distributing the modular functions of the safety system to separate locations within a body of the lighting fixture, if necessary, to obscure its presence.

The safety system and method of the present invention provides its users increased safety by providing illumination for inhabited spaces in the form of low energy night lighting, power failure lighting, alarm condition light or safety warning indication and is integrated with a conventional lighting fixture without noticeably detracting from the lighting fixture design, or room design and décor.

According to another aspect of the invention, a safety module is joined with a conventional lighting fixture. The safety module includes a light source, a power sensing circuit, a control circuit and an alternate power source. The power sensing circuit determines when primary power is lost. The control circuit illuminates the light source to provide emergency lighting to an area adjacent the lighting fixture when primary power is lost. According to another aspect of the invention, light is transmitted from the light source external to the conventional light fixtures. According to another aspect of the invention, the safety module includes a communications circuit for exchanging information with other safety modules in other devices. According to another aspect of the invention, the safety module includes a light sensor for illuminating the light source when ambient light is below a threshold level in order to provide night lighting.

According to another aspect of the invention, the safety module is formed as a separate device which can be attached to the conventional lighting fixture in an unobtrusive manner. According to another aspect of the invention, the safety module is a decorative medallion. According to another aspect of the invention, the safety module is attached to a lamp socket assembly of the lighting fixture. According to another aspect of the invention, the safety module forms a ring around a portion of the lighting fixture.

According to another aspect of the invention, a method for improving safety includes the steps of combining a safety module with a conventional lighting fixture in an unobtrusive manner. According to another aspect of the invention, the method includes sensing the status of a primary power source and illuminating a safety light when primary power is lost. According to another aspect of the invention, the method includes mounting the safety module with the lighting fixture. According to another aspect of the invention, a safety system includes a housing which functions as an integral part of a conventional lighting fixture. The housing is attached to the lighting fixture. The safety system further includes a power sensing circuit, alternate power source, a control circuit and a audio or illumination device. According to another aspect of the invention, the conventional fixture includes a plurality of lights. The safety system includes at least one of the plurality of lights.

BRIEF DESCRIPTION OF DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 3b shows a cross section of the safety system and lamp of FIG. 3a.

DESCRIPTION OF THE REFERENCED NUMERALS

Turning now descriptively to the drawings, in which similar reference characters denote similar elements throughout the several views, the figures illustrate the concealed safety lighting device in different embodiments of the present invention. With regard to the reference numerals used, the following numbering is used throughout the various drawing figures:

10. Safety light source.
15. Safety audio source.
20. Safety module.
25. Mating means.
30. Light transmission element.
35. Reflector
40. Ambient light detector.
45. Light pipe.
50. User control.
60. Battery Compartment.
70. Alternate power source battery.
75. Alternate power source rechargeable battery.
80. Primary power electrical connections.
85. Primary power connection.
90. Circuit board.
100. Battery indicator.
105. Lamp socket.
110. Lamp socket assembly.
115. Lamp shade yolk structure.
120. Lighting fixture structural body member.
130. RF antenna.
140. Lighting fixture mounting bracket.
145. Mounting holes.
147. Mounting screw.
150. Electrical utility workbox.
155. Supporting surface.
160. Power sensing and control circuitry.
165. Trim ring.
170. Lamp control.
175. Wire conduit.
180. Connector.
200. Conventional lighting fixture.
210. Primary light source.
220. array of lighting sources.
230. Subset of array of lighting sources.
410. Power line communication circuit.
420. Signal decode logic
700. Remote system module.
710. Power line signal.
715. Safety audio source.
730. RF antenna.
740. Remote Light Sensor.
750. Power supply plug.
760. Safety light power signal circuit.
770. Remote alternate power source.
775. Reset control.
780. Alarm system interface connector.

DETAILED DESCRIPTION

Energy costs have increased in recent years. The continuing practice of turning on a conventional lighting fixture while passing through a dark area, wastes energy; while not turning it on, invites accidents. An energy efficient night light combined with the conventional lighting fixture is needed where its integration does not compromise the design of various conventional lighting fixtures. Safety lighting also improves the level of safety when replacing a burnt out bulb when it is dark.

Power failures will continue to occur yet many residential and commercial inhabited spaces go dark when the power is out. Permanent, low cost and standard safety lighting that fits in with room décor without being conspicuous is needed to increase the use of safety lighting whenever it is dark. Conventional lighting fixtures are available in various shapes, styles, colors, and differ in construction to suit end user's utility, decorative and stylistic needs. Conventional lighting fixtures do not provide light when the primary utility supplied power is interrupted. This causes a safety concern in inhabited spaces where emergency power failure lighting is not installed. When light is not available, many people resort to using candles or stumble about trying to find flashlights and batteries, largely due to the lack of available power failure lighting solutions that do not impact their room design. Integrating safety lighting into conventional lighting fixtures will result in more installations of safety lighting resulting in safer homes and workplaces. The present invention provides power failure safety lighting and other alarm condition alerting, and includes night lighting for added safety and energy conservation in a widely accepted form of a conventional lighting fixture.

Some amount of light is necessary during the night time to allow people to move about safely. The reduction in size of high output light sources that consume small amounts of power, make integrating them into common electrical devices possible without substantially altering the form and function of the original device. The amount of light emitted from these light sources such as Light Emitting Diodes, electroluminescent panels, or other low power illumination sources allow people to see objects and pathways that might otherwise not be visible in the darkness.

Energy efficient nightlights and power failure lights provide this needed night time illumination. Therefore, the safety light of the present invention comprises one or more safety light sources combined with a conventional lighting fixture in such a way as to allow the safety light source to illuminate the room area in the vicinity of the lighting fixture without substantively changing the form and appearance of said lighting fixture whether primary power is available or not.

Today's gas, smoke and fire sensors are typical life safety detectors that are stand alone devices that mount to a ceiling and connected to primary power through an electric utility workbox. Some models of these sensors can transmit a signal when tripped. The present invention provides an alert using the safety light source and/or safety audio source when signaled by these devices, emanating from a conventional lighting fixture with minimum impact on its design, resulting in fewer electric workboxes and wiring costs. When life safety sensors are included in the design of, or communicating with the present invention, there may be a control information communication path to other installed safety systems causing them to also respond. Modular, distributed design allows replacement of any sensors as they age.

The present invention provides night time lighting using a safety alerting source that is a safety light source. When darkness occurs, a light detection mechanism such as an ambient light sensor as well as a power sensing and control circuit provide a signal to energize the safety light source. Improved safety for use of a night light is also accomplished by the present invention by having the safety light source permanently integrated with the body of, or in intimate contact with a lighting fixture structural member, thus reducing the possibility of being tampered with, misplaced, lost, stolen or simply unplugged and rendered ineffective. Energy savings is accomplished by providing energy efficient night lighting thus reducing the need to turn on the main lights of the conventional lighting fixture when passing through the area near said lighting fixture while the area is dark. The example circuit provided herein consumes approximately 0.3 watts, which is less than one tenth that of a standard 4-watt night light bulb.

Conventional lighting fixtures, whether highly stylized expensive units or low cost functional units, are put in place on walls, floors, tables, cabinets, and ceilings in most inhabited spaces. Openings in wall and ceiling surfaces for electrical workboxes that provide primary power to lighting fixtures are generally covered by a suitable structural member of the lighting fixture that decorates, and/or finishes the rough installation of the electric work box. Decorative medallions or similar platforms that are placed between the lighting fixture and the supporting surface wall or ceiling electrical workbox during installation provide an ornamental structural member for conventional lighting fixtures and are examples of a separate but integral structural member of decoratively installed conventional lighting fixtures. Conventional floor and table lamp lighting fixtures are held in place by gravity means using a structural member to provide support and stability while primary power is provided by an electric line cord and plug.

A conventional lighting fixture typically consists of a primary lighting source and one or more structural members. The structural members are designed to stylize, or to attach, support, stabilize or mount said light fixture in place, or to distribute or direct the light emissions or to position, support and protect the lamps, as well as to connect the lamps to the power supply. A conventional lighting fixture presents numerous opportunities to integrate the safety system of the present invention within its structural members. There are many ways a lighting fixture structural member supports the lighting fixture depending on the design goals of the resulting product as in the descriptions that follow.

For the purposes of the present invention, a safety module is a housing element that provides physical structure or support for a conventional lighting fixture. A safety module helps to stabilize the lighting fixture and may be placed anywhere in the design from the supporting surface up to and including the lamp used for the primary lighting source. A safety module may also contain both main and safety light sources especially when the main light source is an array of low power devices capable of using an alternate power source for lighting purposes.

A conventional lighting fixture's safety module may be directly attached to the electrical utility workbox using a lighting fixture mounting bracket that secures the lighting fixture and the workbox together. A safety module may be mated and secured to the conventional lighting fixture by screws into or through features provided for such purposes, directly into the workbox as in a porcelain lamp holder or medallion. The safety module may be joined to other structural members of a conventional lighting fixture using various mating solutions as part of its design.

The present invention takes advantage of the expected variable appearance and style of lighting fixture components to obscure and effectively conceal the existence of the safety system, thereby rendering the safety system obfuscated, concealed and unobtrusive. For example, a safety module may be a structure that is connected to any member of a conventional lighting fixture and perceived as either a functional, structural or ornamental design element of said member of a conventional lighting fixture to accomplish the purpose of obfuscating of the safety system. While the safety system is described herein as being concealed, all or a portion of the safety system may be readily visible. The safety system is concealed in that the outward appearance fits within the design of the conventional lighting fixture so that the safety system is not obtrusive.

A safety module may be used to cover, trim and seal the rough opening of the electrical wall box, add stability, or provide support to the bulb as in a simple lamp holder fixture. When the safety module is placed in support of a lamp socket assembly, the shape can be circular or any shape pleasing to the eye of the designer or consumer and have mating structure, such as threaded couplers, through holes, weldments, clips, rivets, screws, etc., to mate with the lamp socket assembly and the structural supporting member such as a threaded rod. A safety module can also decorate the installation of lighting fixtures by placing it as a decorative structure between the conventional lighting fixture and the supporting surface that the lighting fixture rests against including table surfaces, mantles, floors or any other architectural surface such as walls and ceilings. A lighting fixture safety module may be separate from, as in a ceiling medallion, or an integral part of the lighting fixture. A lighting fixture safety module may simply be a structural member supporting the light bulb or lamp socket used in an ordinary table or floor lamp and may also be the entire structure of a low cost ceiling or wall fixture. A structural or decorative member of a lighting fixture, or any other base plate or trim ring that may be viewed as part of the installed lighting fixture, can have the safety light module of the present invention integrated during manufacture, or installed after manufacture to provide safety responses as intended by the present invention. A safety module that is integrated with a conventional lighting fixture is in plain view on walls, ceilings, under cabinets, on tables and floors thus providing a means to obfuscate, conceal or obscure the safety system which results in an unremarkable and aesthetic appearance for the safety system of the present invention.

The power sensing and control circuitry may be implemented using multiple modules in communication with each other. The power sensing circuitry monitors primary power and the control circuitry is in electrical communication with a safety alerting source which is a safety light source and/or safety audio source. The modular design allows the safety system of the present invention to be integrated into multiple elements of the lighting fixture. This modular flexibility helps if space is an issue due to the design of the lighting fixture, or as after-market add-on safety module products are created such as a replacement lighting fixture elements or ceiling medallion with an integrated safety system. The power sensing and control circuitry modules may be potted or suitably enclosed and insulated, and placed within the electrical workbox while the safety alerting source is attached to or integrated with a structural member of the lighting fixture. The safety alerting source may use appropriate lenses, reflectors, light pipes, apertures, voids, or other energy transmission elements to direct the emissions of the safety alerting source out into the area adjacent to the conventional lighting fixture.

Conventional lighting fixture installations typically have live primary power connections entering near the base of the conventional lighting fixture allowing the safety module's power sensing circuit to be located within the conventional lighting fixture structure. The power sensing circuit need only be in electrical communication with the primary power source to reliably determine if power has failed. However, the modular nature of the present invention allows the power sensing and control circuits to be independent of each other and/or remotely placed including, but not limited to, in the electrical workbox, in the safety module, remote control using RF or IR signaling, wall switch, or elsewhere centrally located while in electrical communication with the safety alerting source.

In its simplest form, the safety system provides a function such as local or remote controlled, power failure and energy efficient night lighting. When equipped with a safety audio source, the present invention will alert both visually impaired using sound and the hearing impaired using light to an existing safety condition. The safety system of the present invention combines a safety module with conventional lighting fixtures by integrating the associated components of one or more of several safety functions with the structure of lighting fixtures in such a way as to retain the appearance and variety of conventional lighting fixture forms that are commonly installed for illumination purposes. The safety system responds to a variety of safety conditions such as power failures, darkness, externally originated safety conditions such as gas, fire, intrusion and other safety conditions provided by signal that have been detected.

The present invention comprises a safety module for a lighting fixture which may be integral to the light fixture as a means to support, mount or steady the fixture. A safety module may also be described as a trim ring as found in ceiling recessed canister lighting. A separately installed unadorned safety module between the lighting fixture base, such as a simple, relatively flat housing or an ornate ceiling medallion that can be interposed between the supporting surface and the lighting fixture is another example of a safety module for a conventional lighting fixture. A safety module may also be described as an assembly that is interposed between the structural member that supports a lamp socket assembly and the lamp socket assembly in a common floor or table lamp. The safety module comprises a safety alerting source mounted such that the energy from the safety alerting source is emitted through a void, light pipe, wave guide, lens, reflector or other transparent or translucent transmission mechanism allowing the emitted energy of sound or light to disperse into the surrounding area. The safety module may use a variety of mating structure or mechanisms to integrate it with a conventional lighting fixture to appear to be a component of said conventional lighting fixture. Examples of mating mechanisms include, among others, through holes, screws, rivets, nuts and bolts, threaded rods, welds, formed surfaces or structures that securely mate with other formed structures, adhesives and other such joining methods to hold, affix or align said safety module with said conventional lighting fixture.

The present invention further comprises a power sensing and control circuit, in communication with the primary power source for the lighting fixture, having optional circuitry such as a signal input circuit for detecting alarm conditions, energizing a nightlight function using primary power and ambient light level sensing. The power sensing and control circuit detects the presence or lack of presence of the primary power and provides a signal that may cause an alternate power source to provide power in the event of a power failure. The present invention also comprises a safety light source in electrical communication with the power sensing and control circuitry which is energized by the main or alternate power sources. An optional light sensing mechanism may determine when the safety light source may be turned on. A user control mechanism such as a local or remote potentiometer, switch, or derived signal is used to adjust energy levels applied to the safety light source and may be a multifunction control including a simple on-off-test switch.

Each instance of the safety system of the present invention can have an alarm signal input causing the safety light source to turn on in a specified way in response to a signal applied to the alarm signal input. The alarm signal may also be used to initiate an audible alarm for specific alarm conditions. This alarm input feature is optional and may be used to vary the intensity of the safety light source and or energize an audio source as an audible alarm in response to a gas, smoke, intrusion or other life safety condition detectors. Communication between the power sensing and control circuitry and alarm signal inputs may be direct wired RF, IR or other electronic signals including using a power-line communications mechanism. This provides remote control of each safety system when these features are designed into the end product. When used in a network, each system may signal another system thus increasing safety in a wider area than that which a single system may cover.

The present invention compliments a conventional lighting fixture by employing a housing that is specifically shaped in the form of a conventional lighting fixture structural member, medallion, or base trim ring, and may have one or more compartments to house one or more of the modular components of the safety system. This housing shape having at least one safety alerting source, allows the installation of the safety system to be integrated with conventional lighting fixtures. It may have a local alternate power source or remote alternate power source depending on the specific design and safety light illumination or alerting coverage required. Integrating the safety system into the same form factors as conventional lighting fixtures provides the means for obfuscation, concealment and the resulting aesthetical appearance characteristics of the present invention.

Alternate power for the safety light source may be provided by rechargeable batteries or other electricity storage devices where power failures are short lived or higher capacity non-rechargeable batteries or fuel cells where power failures may be long in duration by implementing a simple change to the DC power circuitry. The alternate power source may be integrated with the safety module or remotely located. Once the safety system is integrated with the safety module, a safely removable battery holder for removing and replacing the batteries isolates the user from any normally hazardous power found in lighting fixtures. A battery status indicator may be implemented to alert the user when batteries need replacement or maintenance. An ambient light detector or sensor adjusts the intensity of the safety light source according to available lighting conditions such as daylight, thereby extending the battery life or simply extinguishing the safety light source during the daytime or when other lighting sources are available.

The present invention will provide illumination using the available primary power to energize at least one safety light source, thus providing a night light function. The night light function's safety light source may be different from the power failure safety light source and may also be controlled by the ambient light detector in the same way as the power failure safety light. Using a low power safety light source, for example an LED, provides low cost energy saving illumination and little or no heat further permitting concealed placement in an often confined space.

Modern versions of conventional lighting fixtures are appearing on the market using an array of low-power lighting sources such as LEDs. The control circuitry of the present invention can use a subset of the array of lighting sources to provide a safety light source using alternate power source during a power failure. This accomplishes the goal of providing safety light without affecting the appearance of the conventional lighting fixture.

Multiple safety systems may be installed and controlled by electrically communicating with each other and/or with a remote system module having a power sensing and control mechanism to provide safety lighting economically. In one embodiment, a single power sensing and control module and an alarm interface module are electrically communicating with multiple safety light sources integrated with multiple lighting fixtures. The safety system may be implemented as a full function safety system or as cost reduced models having only power failure lighting, or only night lighting, having few local controls and sensors while also eliminating the local alternate power source module. This modular approach reduces cost when several of the concealed safety systems are installed in a living space providing broad coverage in a dwelling and can be referred to as a distributed whole house safety system. The safety system modules may communicate with the central system module through low power DC wiring. If an alternate power source is in the safety lighting devices, the communication of control information may be accomplished using coded power line communication signals such as X10 over the primary power wiring, or Radio Frequency such as Z-wave or Zig-Bee, Infrared light, audio, voice or other similar communication methods. The whole house system may have an input interface to allow fire, smoke, gas, intrusion or other alarms to enable the safety system to visually or audibly alert the occupants of the alarm condition. This allows multiple areas to be covered and allows persons in the immediate area, including those with visual or hearing impairment, to be alerted.

The individual elements of the present invention when used in conjunction with each other provide a system for illuminating an area or providing audible or visual alerts. This system can be modular or unitary in construction to provide the flexibility needed to adapt to the wide variety of shapes, styles and sizes of conventional lighting fixtures. When adapted to be in contact with a conventional lighting fixture, the system provides a means and method to blend in with the normal appearance of a conventional lighting fixture thereby concealing, obfuscating or rendering its presence indistinct.

The safety system of the present invention may be implemented nearly anywhere in the path between the primary power source and the primary lighting source and considered to be part of the lighting fixture as viewed by the designer or consumer. The purpose of the safety system is to provide safety lighting and alerting in the same general area that is lighted by the conventional lighting fixture without negatively impacting the design elements of the area or the lighting fixture, and to eliminate the need to provide additional separate safety lighting devices. The light is provided by energy saving night lighting and/or power failure lighting emitted by the present invention. Audio alerting is optionally provided by the system designer.

Figure 7A:
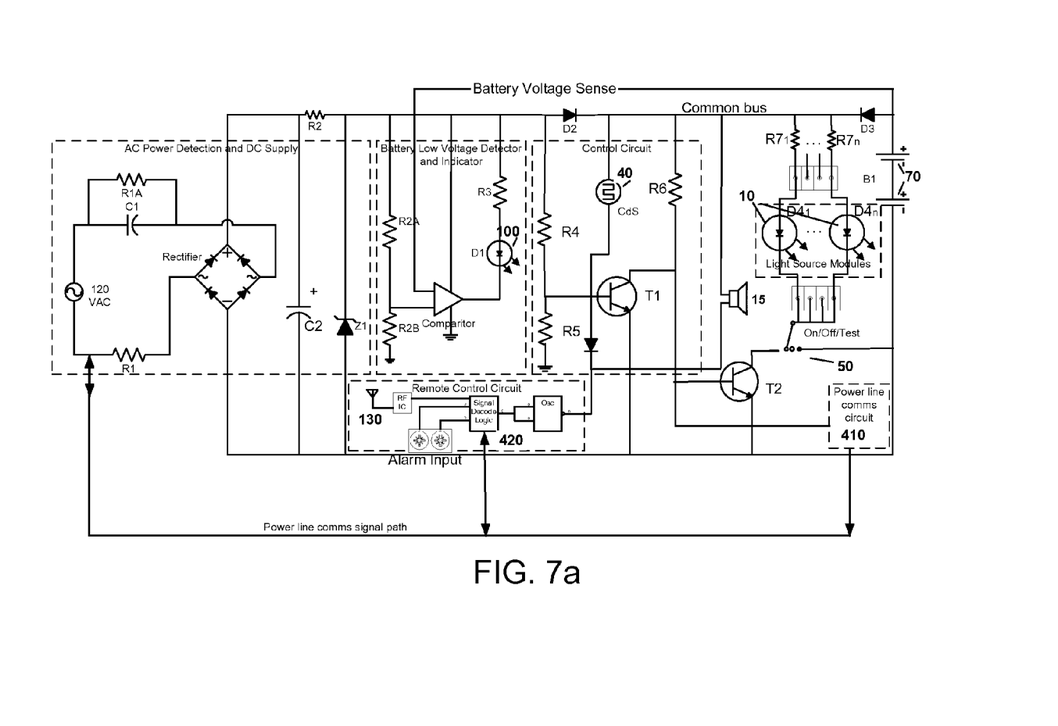
FIG. 7a is a reference design schematic for a safety system according to an embodiment of the present invention.
Figure 7B:
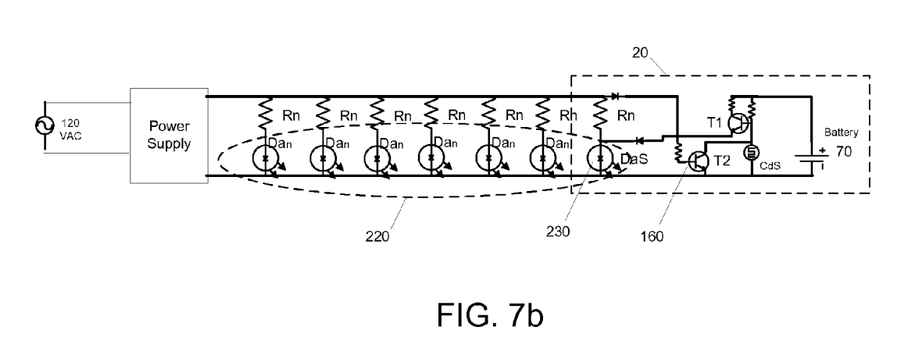
FIG. 7b is a reference design schematic for safety system according to an embodiment of the present invention when integrated with a multi-element light source array type lighting fixture.
Figure 8:
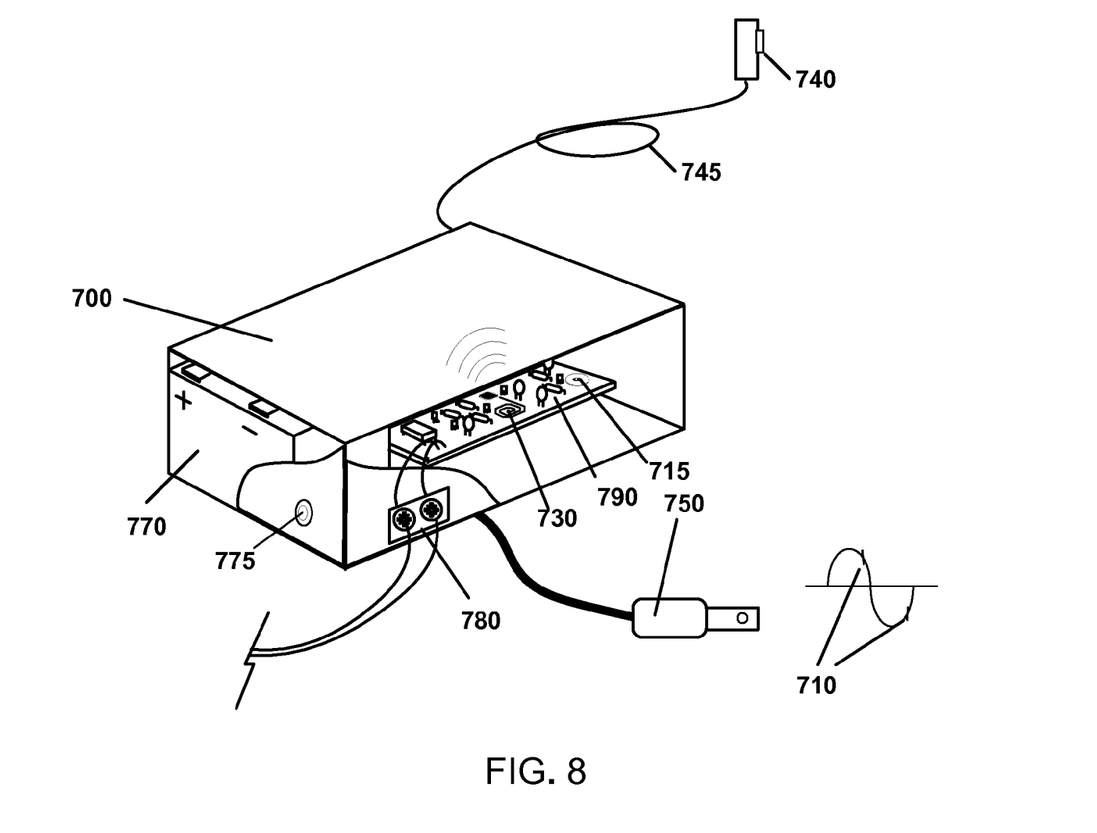
FIG. 8 shows a remote system module of the safety system communicating as a distributed whole house system for multiple safety systems.

Turning now descriptively to the drawings, in which similar reference characters denote similar elements throughout the several views, FIGS. 1A through 6 illustrate multiple implementations of the safety system of the present invention using classic styles of conventional lighting fixtures. FIG. 7 shows a sample schematic view of one implementation of the present invention. FIG. 8 shows a remote system module of the present invention.

Figure 1A:
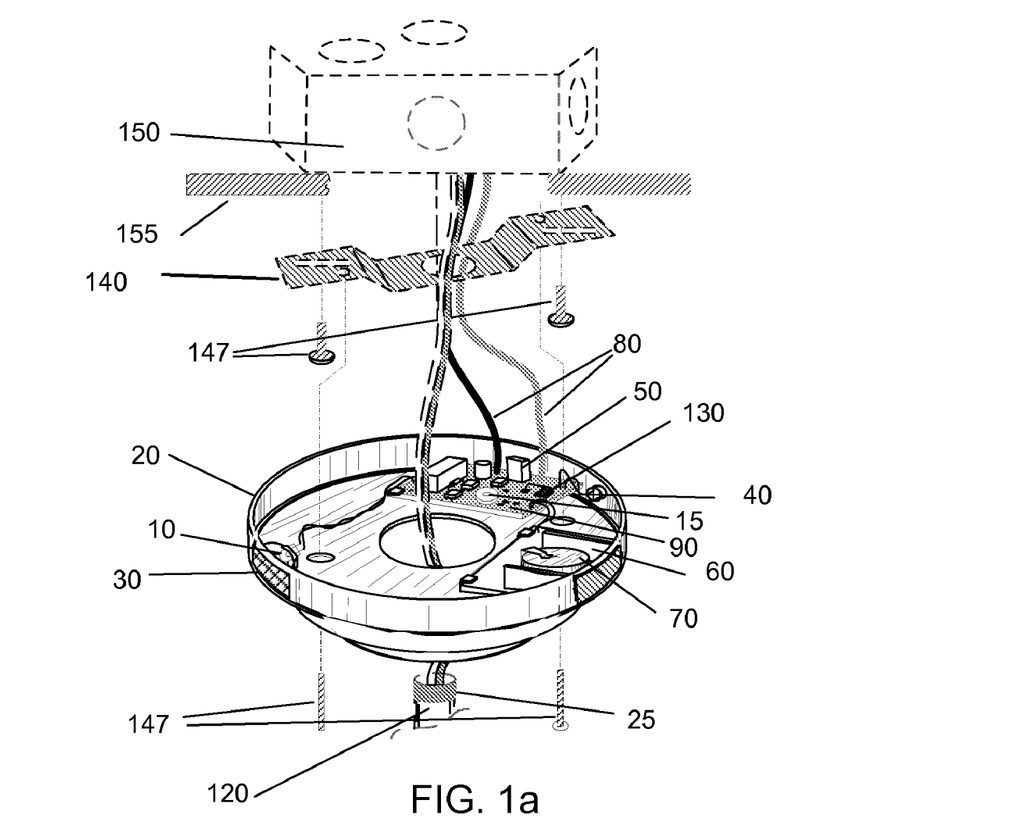
FIGS. 1a and 1b shows a safety system combined with a conventional lighting fixture for mounted on a ceiling or wall.

FIG. 1a shows a conventional lighting fixture having a safety module 20 to be installed against the supporting surface 155 and mounted to the electrical utility work box 150 using lighting fixture mounting bracket 140. The safety light source 10 mounted in the safety module 20 in such a way as to allow the light to escape from the safety module 20 emitting light through the light transmission element 30 which in this embodiment is a diffuser or lens. The figure also illustrates one method of installing the alternate power source battery 70 so as to allow users to change it when necessary by removing the battery compartment 60. The ambient light detector 40 is mounted in the normally exposed area of the lighting fixture safety module 20 in such a way as to sense surrounding light levels and provide a signal to adjust the level of power to the safety light source 10. The light fixture safety module 20 is attached to lighting fixture mounting bracket 140 having all the standard structure to allow installation into a standard electrical utility work box 150 using mounting screws 147 into mating means 25. The resulting installed lighting fixture otherwise appears substantially the same as a conventional lighting fixture. The primary power electrical connections 80 electrically communicate with the light fixture and circuit board 90 providing power for the safety system. RF antenna 130 may be designed in to receive or transmit signals of status or change of status of any alerting conditions. Optional safety audio source 15 will provide audio alert when specific conditions are detected either remotely or locally originated depending on programming and circuit design.

Figure 1B:
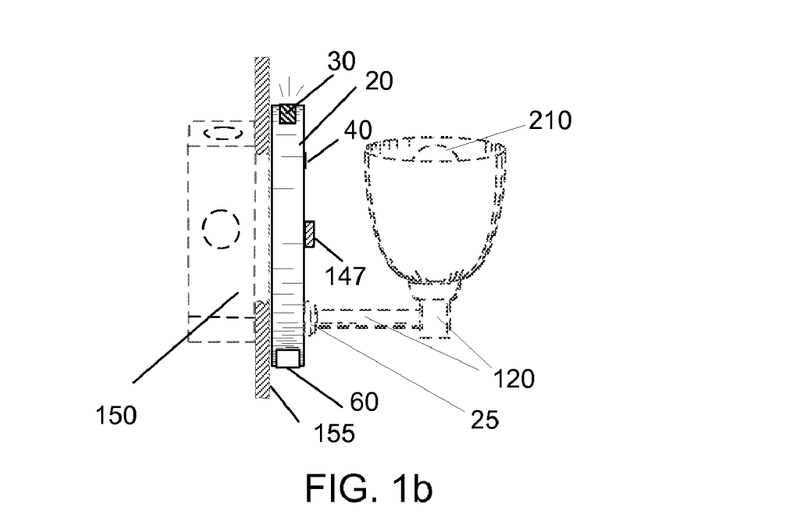

FIG. 1b shows a safety module 20 mounted as a conventional lighting fixture for a wall to electrical utility workbox 150 against supporting surface 155 by mating means 25 which, in this example, is a threaded rod having a threaded nut. Light transmission element 30 allows the safety light to be emitted upwardly from the safety module 20. Battery compartment 60 is shown along with ambient light sensor 40, both performing the same functions as described in FIG. 1a. description. The conventional lighting fixture contains a primary light source 210 supported by lighting fixture structural members 120 and affixed to safety module 20 using mating means 25.

Figure 2A:
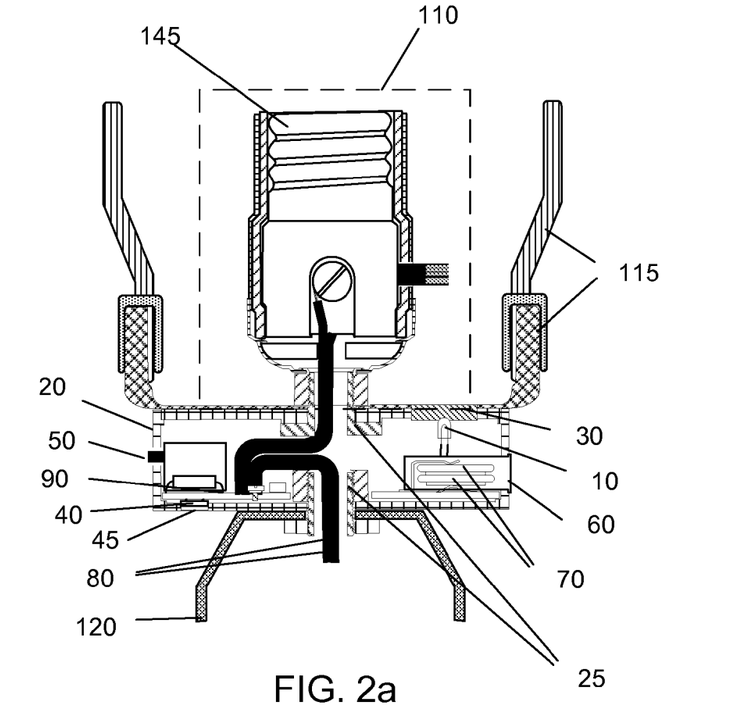
FIG. 2a is a cross section of a complete system in a safety module designed for a conventional lamp style lighting fixture according to an embodiment of the present invention.
Figure 2B:
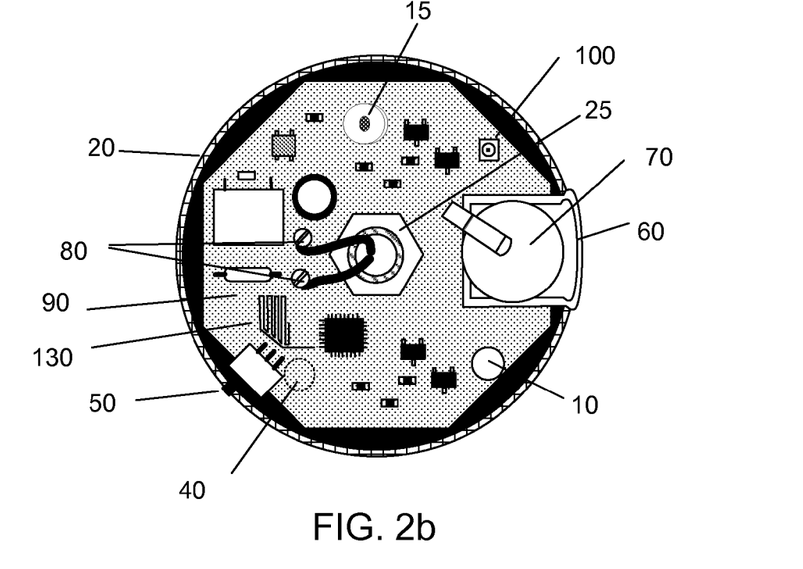
FIG. 2b is a top cross section view of an embodiment of the present invention as integrated into a lamp structure.

FIG. 2a shows a cross sectional view of a safety module 20 designed to mate with a conventional lamp using a threaded coupler mating means 25. FIG. 2b is a top view of the safety module 20. Both figures utilize the same reference numbers and are subject to the following description. Safety light source 10 is mounted in safety module 20 in such a way as to allow light to be emitted in an upward direction through light transmission element 30 and into the room area normally illuminated by any bulb that is inserted into lamp socket 105.

Circuit board 90 is connected to primary power electrical connections 80 that are also in electrical communication with the lamp socket 105. Battery compartment 60 holds the alternate power source battery 70 and is removable to allow easy battery replacement. User control 50 allows the user to set the energy level of safety light source 10 to on, off or any state in between those two states. Ambient light detector 40 is positioned to sense light levels through light pipe 45. When equipped with an RF communications capability, RF antenna 130 acts as a receive and/or transmit antenna allowing the safety light system to be controlled from a remote location and to control other devices if so programmed. Optional safety audio source 15 will provide audio alert when specific conditions either remotely or locally originated are detected. Battery indicator 100 will warn users of a low battery condition. Safety module 20 is coupled to lighting fixture structural member 120 rendering the safety system of the present invention indistinct and thus concealed by appearing to be part of the conventional lighting fixture 200.

Figure 3A:
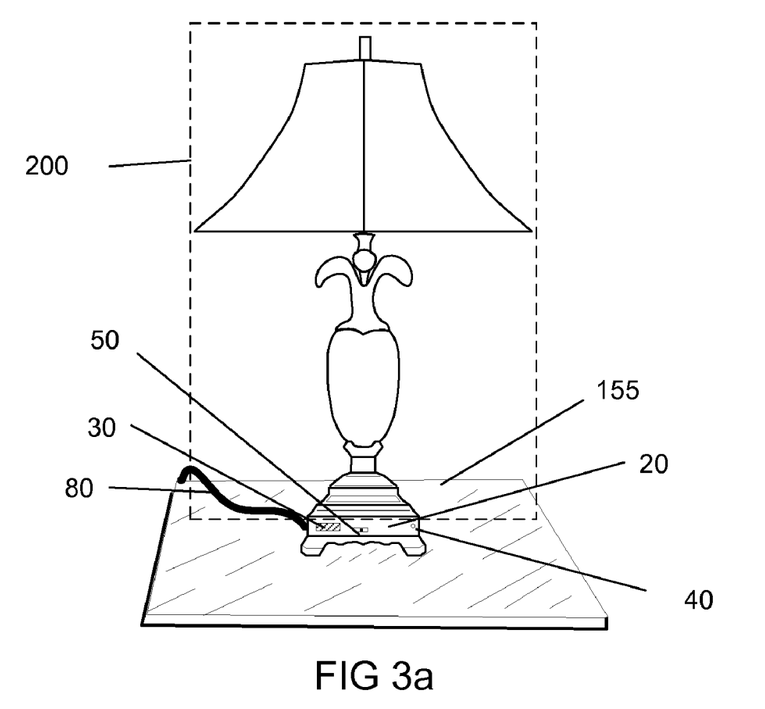
FIG. 3a shows a safety system according to an embodiment of the present invention integrated into a lower body structure of a conventional table or floor lamp.

FIG. 3a shows a conventional lighting fixture 200 commonly thought of as a table lamp when the upwardly facing supporting surface 155 is a table surface. It could also be thought of, and is functionally the same as a floor lamp when the upwardly facing supporting surface 155 is a floor. For the purpose of the present invention, the following description serves any type of lamp.

Figure 3B:
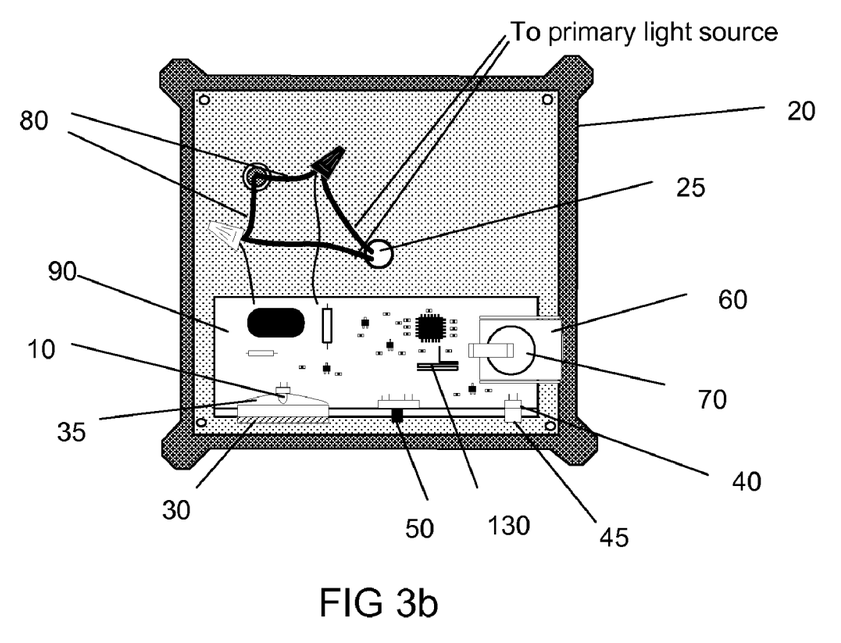

FIG. 3b shows the safety module 20 removed from the conventional lighting fixture 200 and reveals this implementation of the present invention. Both figures utilize the same reference numbers and are subject to the following description. Safety light source 10 is mounted in base structure 20 in such a way as to allow light to be emitted in an outward direction through light transmission element 30 and into the room area normally illuminated by conventional lighting fixture 200. Circuit board 90 is connected to primary power electrical connections 80 that are also in electrical communication with the conventional lighting fixture 200 primary light source (not shown). Battery compartment 60 holds the alternate power source battery 70 and is removable to allow easy battery replacement. User control 50 allows the user to set the safety light to on or off or anywhere in between those two states. Ambient light detector 40 is positioned to measure light levels through light pipe 45. When equipped with an RF communications capability, RF antenna 130 acts as a receive and transmit antenna allowing the safety light system to be controlled from a remote location and control other devices if so programmed. The safety module 20 is affixed using conventional lamp hardware to the complete lighting fixture through mating means 25, thus rendering the safety system of the present invention indistinct and concealed by appearing to be part of the conventional lighting fixture 200.

Figure 4A:
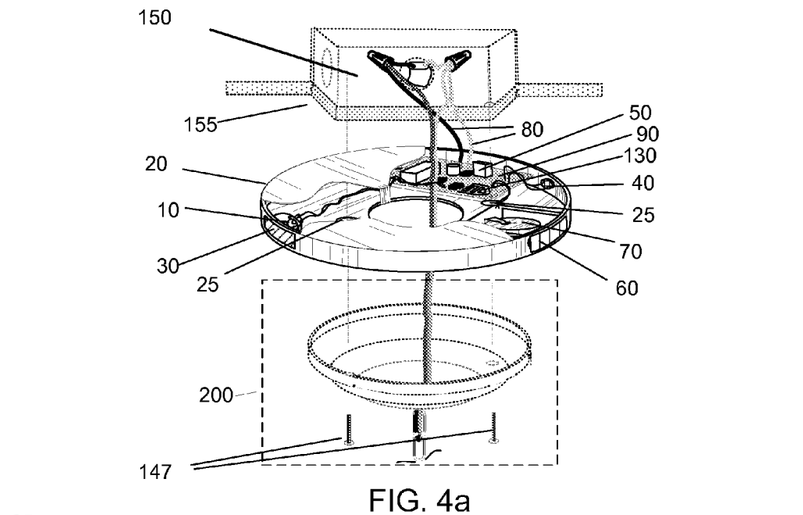
FIG. 4a shows a separate safety module housing for wall or ceiling lighting fixture according to an embodiment of the present invention.

FIG. 4a shows an add-on safety module 20 of the present invention having sufficient shape and structure allowing it to be held in place by mounting between a supporting surface 155 and the conventional lighting fixture 200. Primary power electrical connection 80 is made in the electrical utility workbox 150 and is in electrical communication with circuit board 90 which contains a power sensing and control functionality on board. Ambient light detector 40 senses the surrounding levels of light which provide the control circuitry to change the level of power provided to safety light source 10. Safety light source 10 is mounted such that it emits light into the surrounding area through light transmission element 30 which is a decorative lens. Optional user control 50 and optional RF antenna 130 allow external control of the energizing of safety light source 10 and to control audio alerting source safety audio source 15.

Figure 4B:
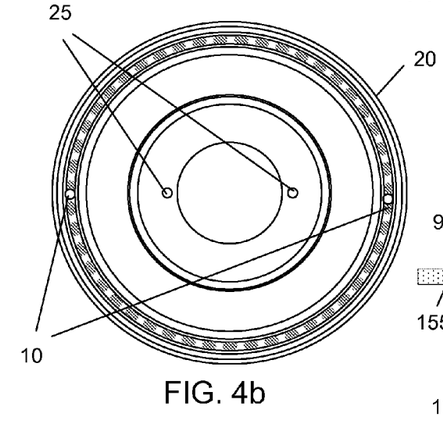
FIGS. 4b and 4c show front and cross sectional views of an embodiment of the present invention in the form of an ornate ceiling medallion for a light fixture.
Figure 4C:
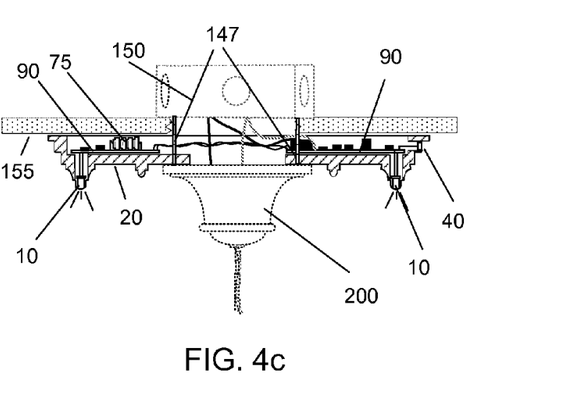

FIGS. 4b and 4c show a fully decorated safety module 20 commonly known as a ceiling medallion, although medallions are also used for wall mounted lighting fixtures. In this embodiment, the safety light source 10 is mounted such that the light emitted is orthogonal to the plane of the safety module Mounting holes 140 are used to position and securely hold safety module 20 in place between conventional lighting fixture 200 and the supporting surface. Given the semi-permanent installation method where user access is somewhat inconvenient, an alternate power source rechargeable battery 75 is used to provide local alternate power in the event of a power failure. Circuit board 90 has the ambient light sensor 40 and the safety light source 10 emits light through an aperture that may have less aesthetic impact than a lens or other light transmission solution.

Figure 5A:
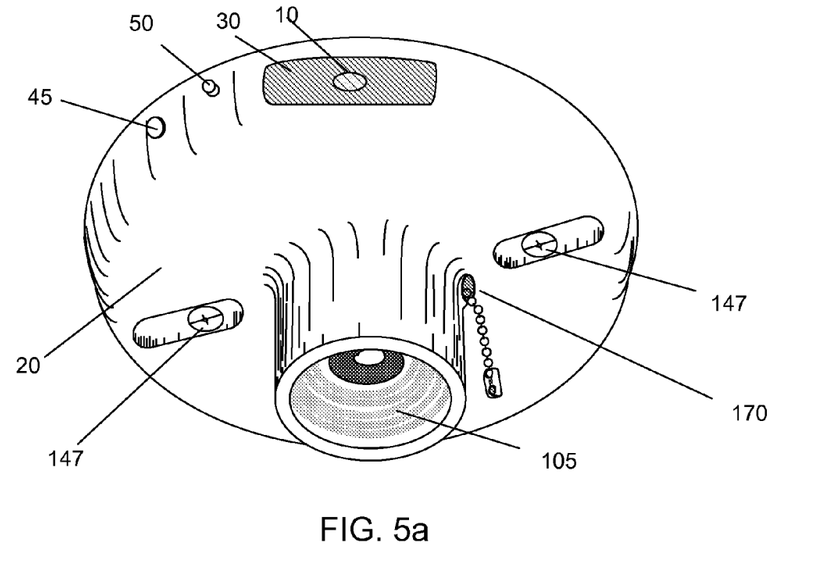
FIG. 5 shows a utility lamp holder conventional lighting fixture with an embodiment of the present invention.
Figure 5B:
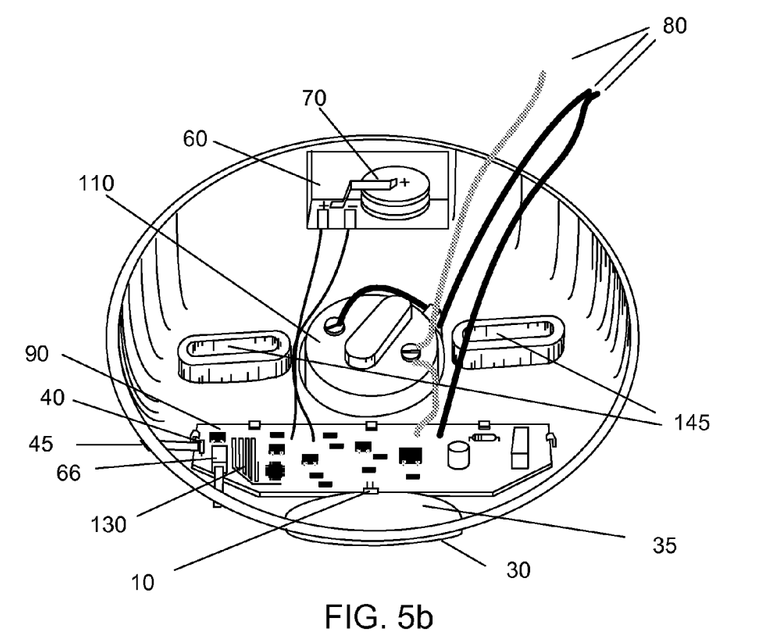

FIGS. 5a and 5b show external and internal views of yet another embodiment of the present invention where the safety module 20 is a low cost, utility grade lamp holder lighting fixture which typically holds a single light bulb. The remaining description of this embodiment is not substantially different from previously described embodiments.

Figure 6A:
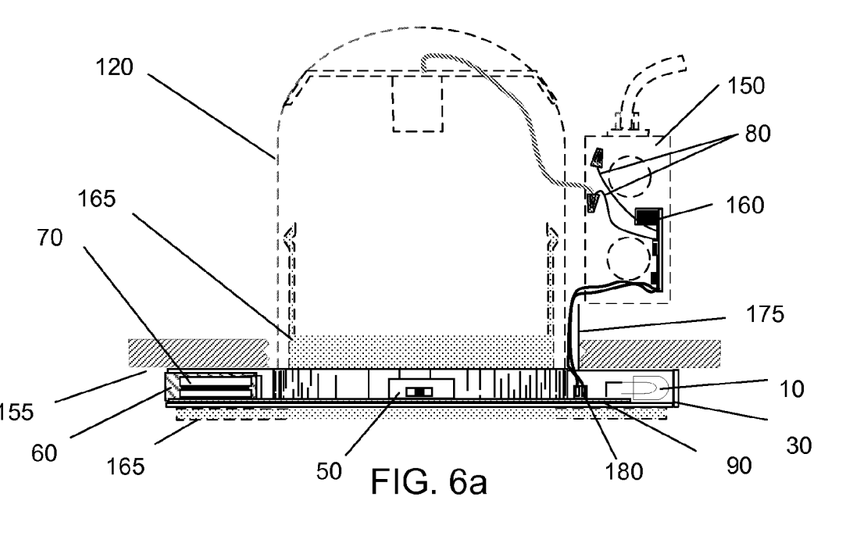
FIGS. 6a and 6b show a safety module for recessed lighting fixtures according to an embodiment of the present invention.
Figure 6B:
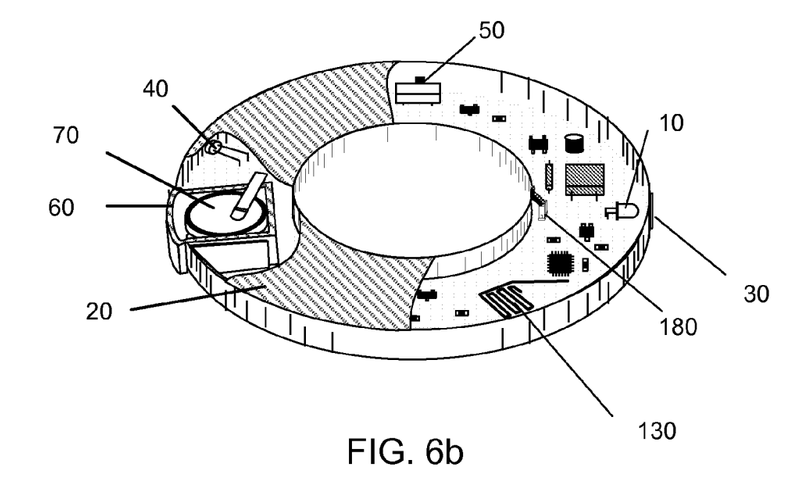

FIGS. 6a and 6b show another embodiment of the present invention where the safety module 20 is an annular shaped housing which is a trim ring or is fixed in place between a trim ring and supporting surface 155 which surrounds a recessed style lighting fixture structural member 120, sometimes called a "high-hat" fixture. Safety module 20 may also be the trim ring having an integrated housing depending on the design of the safety module 20. FIG. 6a show an implementation of the power sensing and control circuitry 160 being placed in the electrical utility workbox 150. Circuit board 90 is in electrical communication with power sensing and control circuitry 160 through connector 180 reducing the electrical component count with this design, thus enabling the designer to reduce its size and make it least noticeable while able to provide safety light using safety light source 10. User control 50 may optionally be used to change the energy level to the safety light source 10. Battery compartment 60 holds alternate power source battery 70. The cut away view in FIG. 6b shows the optional RF antenna 130 that may be used to control the system from a remote location.

The following describes one design of how the safety system reference design circuitry operates to provide necessary function as described in the present invention. Referring to FIG. 7a, Power Detection and DC Supply, this circuit represents a common transformer-less low power DC power supply design and may be implemented in other ways without impacting the scope of this present invention.

Battery Low Voltage Detection: Many devices are currently available to detect a voltage threshold and activate an indicator when an alternate power source is present. This is one design to demonstrate how the present invention is able to incorporate the function. This circuit is optional and may be omitted without impacting the scope of the present invention. Diode D3 prevents charging of replaceable batteries and is replaced with a current limiting and charging mechanism when using rechargeable batteries as in the whole house system module 700.

Power sensing and control circuits: In this example power signal control circuit, transistor T1 is held in the on state through resistor divider network R4 and R5 as long as power is available. The signal output of T1 will keep the safety light source 10, in this reference example (LED D4), in the off state by turning off the switching circuit, in this example, transistor T2. Current flow while power is applied is supplied through one way current passing element D2 through R6, through T1.

In this reference example, when it is light, ambient light detector 40 (CdS) will hold T1 on, T2 off and safety light source 10 LED D4 off.

When power is available, transistor T1 can optionally be used to control the brightness of the safety light source 10, (LED D4) through the ambient light detector 40, CdS and to provide a night light function by changing the bias voltage at the base of T1 to a value that allows transistor T1 to switch off when a predetermined light level is reached.

When power is unavailable and an alternate power source 70 supplies current through one way current passing element D3, transistor T1 will control the brightness of the safety light source 10 (LED D4) through the ambient light detector 40, (CdS) which will develop a lower resistance as more light is detected. This raises the bias voltage on the base of transistor T1 with respect to the amount of ambient light detected, thereby turning off D4 and reducing current drain on the alternate power source battery 70 (B1) to extend its usable life.

Lighting control: The safety light source 10, in this reference example a light emitting diode, $D4_1$ through $D4_n$, will remain off while switching circuit transistor T2 is off. Resistor $R7_1$ through $R7_n$ limits the amount of current through the LEDs and is chosen to optimize light output and battery life. The optional on-off-test user control 50 will allow the safety light source 10 (LED $D4_1$ thru $D4_n$) to be deactivated. When an alternate power source 70 is incorporated, the low voltage detector circuit is designed into the circuit in such a way as to energize the low battery warning indicator 100 (D1) when power is present and the battery voltage falls below a certain voltage determined by the resistor divider R2A and R2B. Switching circuit using transistor T2 can be implemented using electromechanical or electronic solid state switching devices such as relays or gate controlled semiconductors.

Alarm Condition Blink Circuit: Receiving a coded signal through RF antenna 130, through power line communications, or closing the circuit at the Alarm Input terminals causes the signal decode logic 420 to enable the oscillator circuit to affect the base of T1 in conjunction with the ambient light detector 40 regardless of the source of power. This signal allows transistor T2 to turn current on and off through the safety light source 10 (LED $D4_1$ thru $D4_n$) or safety audio source 15 causing them to variably energize in response to the alarm condition. The power line comms circuit 410 sends a coded signal out over the primary power source such as through power supply cord 750 when so equipped.

FIG. 7*b* shows a simplified schematic example of a safety module 20 integrated with a lighting array lighting fixture used to provide full power lighting using utility supplied power after being converted in the power supply to appropriate voltage levels for the array of lighting sources 220. A subset of array of lighting sources 230 of the array of lighting sources 220 is powered by an alternate power source battery 70 in the event of power failure which is detected by power sensing and control circuitry 160. Ambient light detector 40 turns off power to the subset array of lighting sources 230 when light is sensed to conserve power. This approach can be implemented in an under-cabinet strip type conventional lighting fixture or any conventional lighting fixture having an array of lighting elements.

The above circuit descriptions of the reference designs indicate how the safety system can be implemented to provide the necessary feature and function of the described present invention.

FIG. 8 shows a remote system module 700 used to alternatively control the safety system when installed in various locations in a protected are such as whole house coverage. Light sensor 740 is electrically coupled to the system module 700 through wire 745 to allow the system module 700 to monitor ambient light levels that may not be near the system module 700. Light sensor 740 may be mounted any place that the user determines to sample light levels effectively. An alternate power source battery 770 is located in a single system module 700. A coded power line signal 710 is transmitted over the primary power wiring or using an RF transmission on the RF antenna 730. A signal input shown here as the alarm input terminals 780 feeding into the signal decode logic 420 causes the system module 700 to communicate with all the connected safety light systems depicted in reference FIGS. 1 through 6 and energize their safety light sources 10 or safety audio sources 15 until the alarm condition is removed or the reset control 755 is actuated. The power line comms circuit 410 shown in FIG. 7 sends an electronic coded signal through the power supply cord 750 or out RF antenna 730 to remotely turn on safety lights in those safety systems that have local alternate power available. The circuit board 790 contains the logic and circuitry necessary to provide all the functions of the present invention and is detailed in FIG. 7. System module 700 monitors power through the power supply cord 750 which plugs into utility supplied power. Power supply cord 750 supplies power to the system module 700 which converts high voltage to low voltage DC power. When this DC power is interrupted due to a power failure or any other reason, the logic on circuit board 790 signals the safety audio source 715 and/or the safety light source 10 in each safety system to emit light or sound using power from the alternate power source battery 70.

The arrangement in FIG. 8 demonstrates one design having a signal input in a remote system module that is in communication with one or more safety systems providing safety lighting and alerting to one or more areas from a central control location.

From the above description it can be seen that the safety system provides safety light in several ways including general night lighting, power failure lighting, and an alarm condition alerting using visual and audio indication. The safety system and components can be completely integrated into lighting fixtures, or distributed as separate modules that are in electrical communication with the safety system concealed in lighting fixtures from a remote system module. The safety system is capable of being constructed in a small enough form factor to integrate the light source and the associated modules into a conventional lighting fixture's structural elements to overcome the shortcomings of prior art devices.

A safety system that provides safety lighting and audio alerting in a concealed or inconspicuous way is described. It is capable of providing night lighting and alarm condition visual and audio alerts, and is able to detect the occurrence of a power failure and subsequently provide safety lighting. The safety system includes an alternate power source which can take the form of, but is not limited to non-rechargeable batteries or rechargeable batteries with sufficient power density to provide a useful lighting period during utility supplied primary power failures. The safety system also includes an ambient light detector for extending the life of the battery and turning off the nightlight feature during the day, and an optional on-off user control light fixture for selectively testing, resetting or turning the safety light off when not needed. Furthermore, the safety system of the present invention is simple and easy to install and use, incurs little if any noticeable impact on lighting fixture design or room decor and is economical to manufacture.

Many variations of the shape and mounting of the concealed safety light source are possible given the modular implementations that the safety system supports. This modular nature provides a means to obfuscate, conceal or obscure its presence. For the purpose of demonstrating the versatility of the present invention, the figures and drawings depict several example embodiments of the variations. Other designs that can render a safety light source indistinct or concealed by integrating it with a lighting fixture are possible within the scope of the present invention.

While certain novel features of this invention have been shown and described using exemplary preferred embodiments, the scope of the invention is not intended to be limited to the details above, since it will be understood that various omissions, modifications, substitutions and changes in the forms and details of the device illustrated, and in its operation can be made by those skilled in the art without departing in any way from the spirit of the present invention. Therefore, the scope of the claims should be accorded the broadest interpretation so as to encompass all such modifications and similar arrangements.

What is claimed is:

1. A safety system for use in combination with a conventional lighting fixture, said conventional lighting fixture comprising a primary light source, a current carrying means to provide power to said primary light source, and at least one body member, said safety system comprising:
    a. a safety module comprised of a housing, said housing having at least one compartment, said safety module further having a shape suitable for use as a body member of said conventional lighting fixture, said safety module further having a mating means to join said safety module to said conventional lighting fixture;
    b. at least one safety light source to provide power failure lighting, said safety light source disposed to enable light emitted from said safety light source to illuminate an area adjacent to said conventional lighting fixture;
    c. a power sensing circuit in electrical communication with a primary power source;
    d. a control circuit in electrical communication with said power sensing circuit said control circuit providing a signal to control said safety light source, said signal derived from an output of the power sensing circuit; and
    e. an alternate power source in electrical communication with said control circuit;
    whereby said safety system is visually and mechanically integrated with said conventional lighting fixture thereby providing safety lighting to an area without substantially impacting said area's intended design and decor.

2. The safety system as in claim 1 wherein the control circuit further includes a signal input means to cause said control circuit to provide a predetermined signal in response to a change in state on said signal input means.

3. The safety system as in claim 1 wherein said safety module further comprises a light transmission means for said safety light source, said light transmission means arranged to convey light emitted from said safety light source external to said safety module.

4. The safety system as in claim 1 wherein said safety module has a suitable shape and structure to affix said housing to said conventional lighting fixture's related electrical workbox.

5. The safety system as in claim 1 wherein the control circuit further comprises a communications means for an exchange of control information with a remote safety system.

6. The safety system as in claim 1 wherein said safety module further comprises at least one planar supporting surface suitable for maintaining a conventional lighting fixture in place through gravity.

7. The safety system as in claim 1 further comprising a light sensor to determine a light level external to said conventional light fixture.

8. The safety system as in claim 1 wherein said control circuit further comprises a user control mechanism to manipulate the state of said safety system.

9. The safety system as in claim 1 wherein said safety module has a shape of sufficient proportions to permit said safety module to be interposed between said conventional lighting fixture and a supporting surface whereby said safety module acts in concert with mounting said conventional lighting fixture to said supporting surface.

10. The safety system as in claim 9 wherein said supporting surface is one of a ceiling and a wall and wherein said safety module is a decorative medallion.

11. The safety system as in claim 1 wherein said safety module has a mating means to permit said safety module to be affixed in alignment with a lamp socket assembly of said conventional lighting fixture.

12. The safety system as in claim 1 wherein said conventional lighting fixture is a recessed lighting fixture and wherein said housing is an annular ring.

13. The safety system as in claim 1 wherein said control circuit further comprises an alternate power source sensing circuit and a warning indicator when a power level in the alternate power source is low.

14. The safety system as in claim 1 wherein said primary light source includes an array of light sources, said at least one safety light source includes at least one of said array of light sources.

15. A method to improve safety in an area while substantially obscuring a safety system's presence in said area, the method comprising the steps of:
    a. combining a safety module with a conventional lighting fixture, said safety module having a housing that substantially resembles a design element of said conventional lighting fixture;
    b. determining if a safety condition exists using said safety module;
    c. controlling at least one safety alerting source including one of safety light source and safety audio source based upon the existence of a safety condition; and
    d. conveying the energy output of said safety alerting source into said area normally illuminated by said conventional lighting fixture.
    e. providing at least one mating structure as a means for physically associating said safety module with said conventional lighting fixture in a manner consistent with the structure, shape, style and installation of said conventional lighting fixture.

16. The method of claim 15, wherein the safety condition includes a loss of primary power and wherein the safety alerting source includes a safety lighting source.

17. A safety system for a conventional lighting fixture, said conventional lighting fixture comprising a primary power source, a mounting means to attach a primary light source, and at least one body member, said safety system comprising:
    a. a safety module, said safety module comprising a housing, said housing connectedly functioning as a body member of said conventional lighting fixture;
    b. at least one safety alerting source including one of a safety light source and a safety audio source;
    c. an alternate power source;

d. a power sensing circuit in electrical communication with said primary power source;
e. a safety condition circuit for determining a safety condition; and
f. a control circuit controlling said safety alerting source based upon an output of the power sensing circuit and the safety condition circuit.
g. a mating means to affix said housing to at least one body member of said conventional lighting fixture.

18. The safety system of claim 17 wherein the at least one safety alerting source includes a safety light source, and wherein said primary light source includes a plurality of light sources, said safety light source includes at least one of said plurality of light sources.

19. The safety system of claim 17 wherein said conventional lighting fixture is a light strip mounted to a cabinet shelving surface.

20. The safety system of claim 17 wherein the housing is an ornamental part of said conventional lighting fixture.

* * * * *